M. J. STACK.
MEANS FOR FOLDING AND ROLLING UP COTTON BATTING.
APPLICATION FILED JUNE 15, 1909.
1,053,544.
Patented Feb. 18, 1913.
10 SHEETS—SHEET 1.
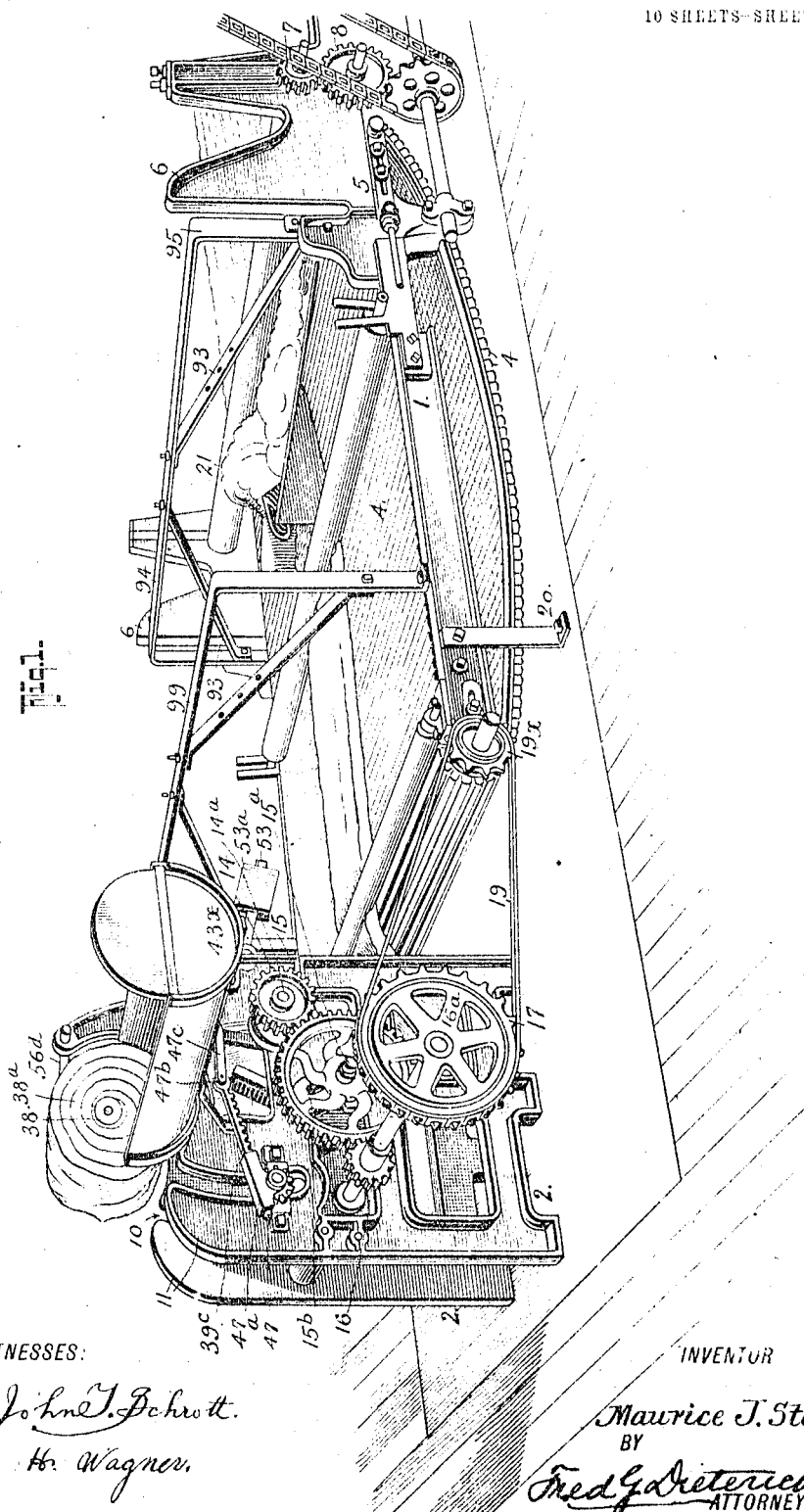
WITNESSES:
John J. Schrott.
Charles H. Wagner.
INVENTOR
Maurice J. Stack.
BY
Fred G. Dieterich
ATTORNEYS.

M. J. STACK.
MEANS FOR FOLDING AND ROLLING UP COTTON BATTING.
APPLICATION FILED JUNE 13, 1909.
1,053,544.
Patented Feb. 18, 1913.
10 SHEETS—SHEET 2.
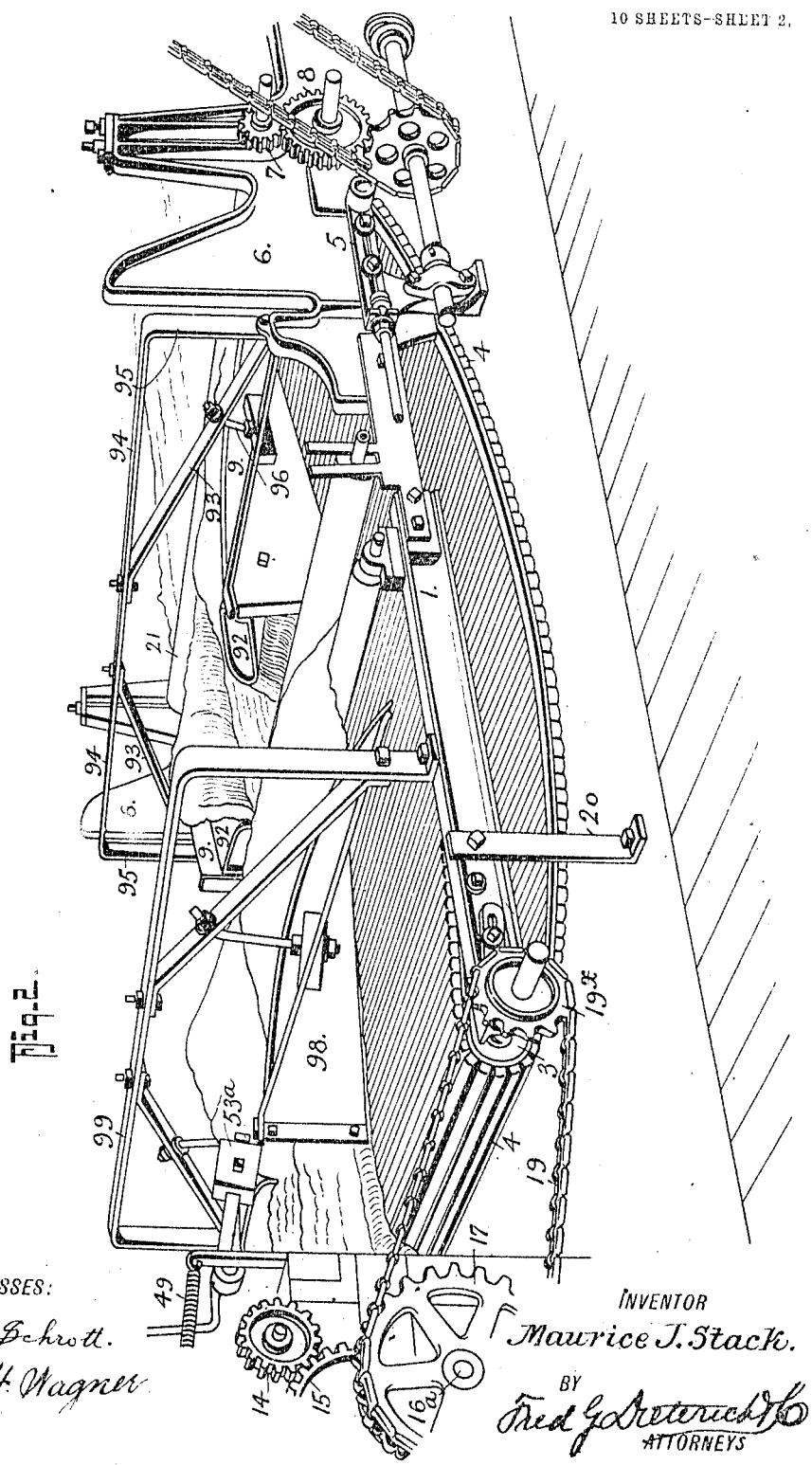

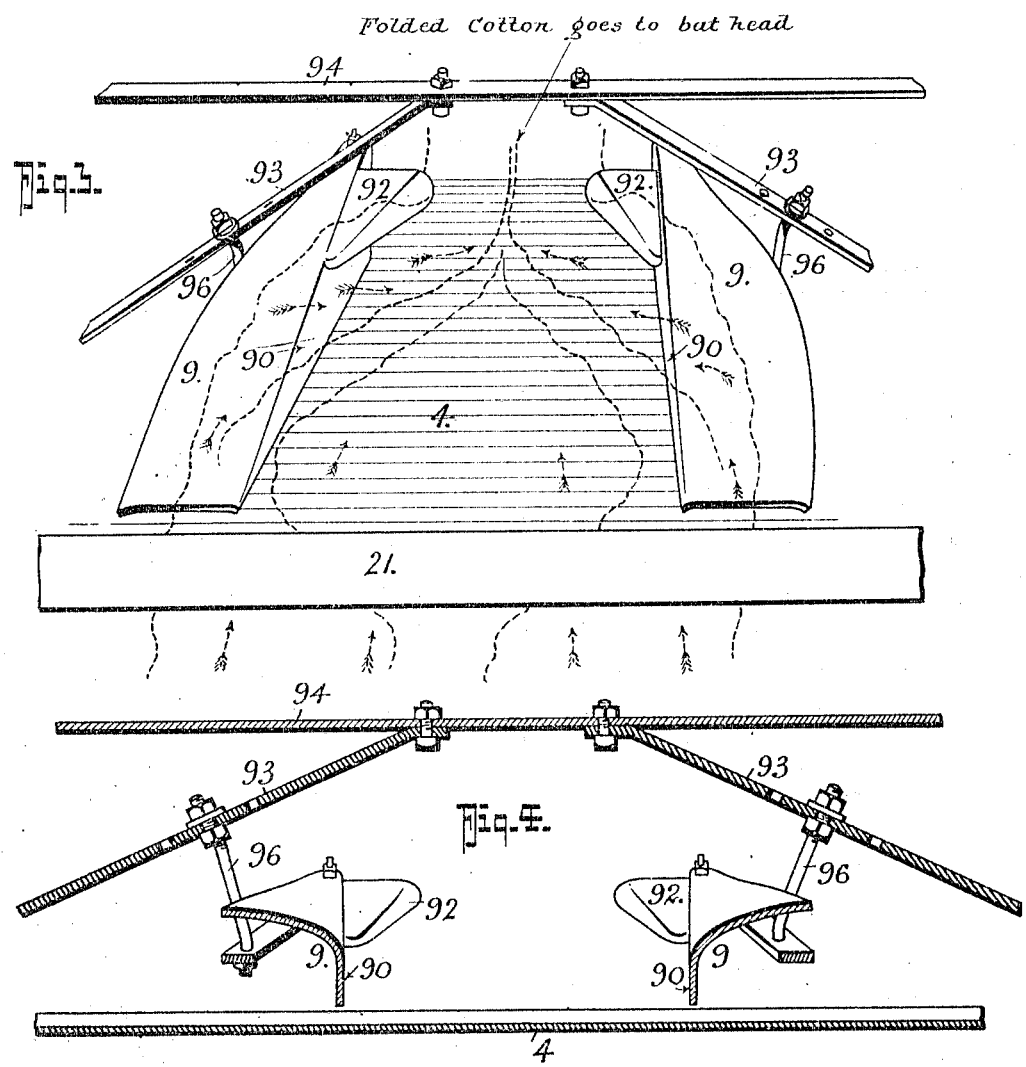

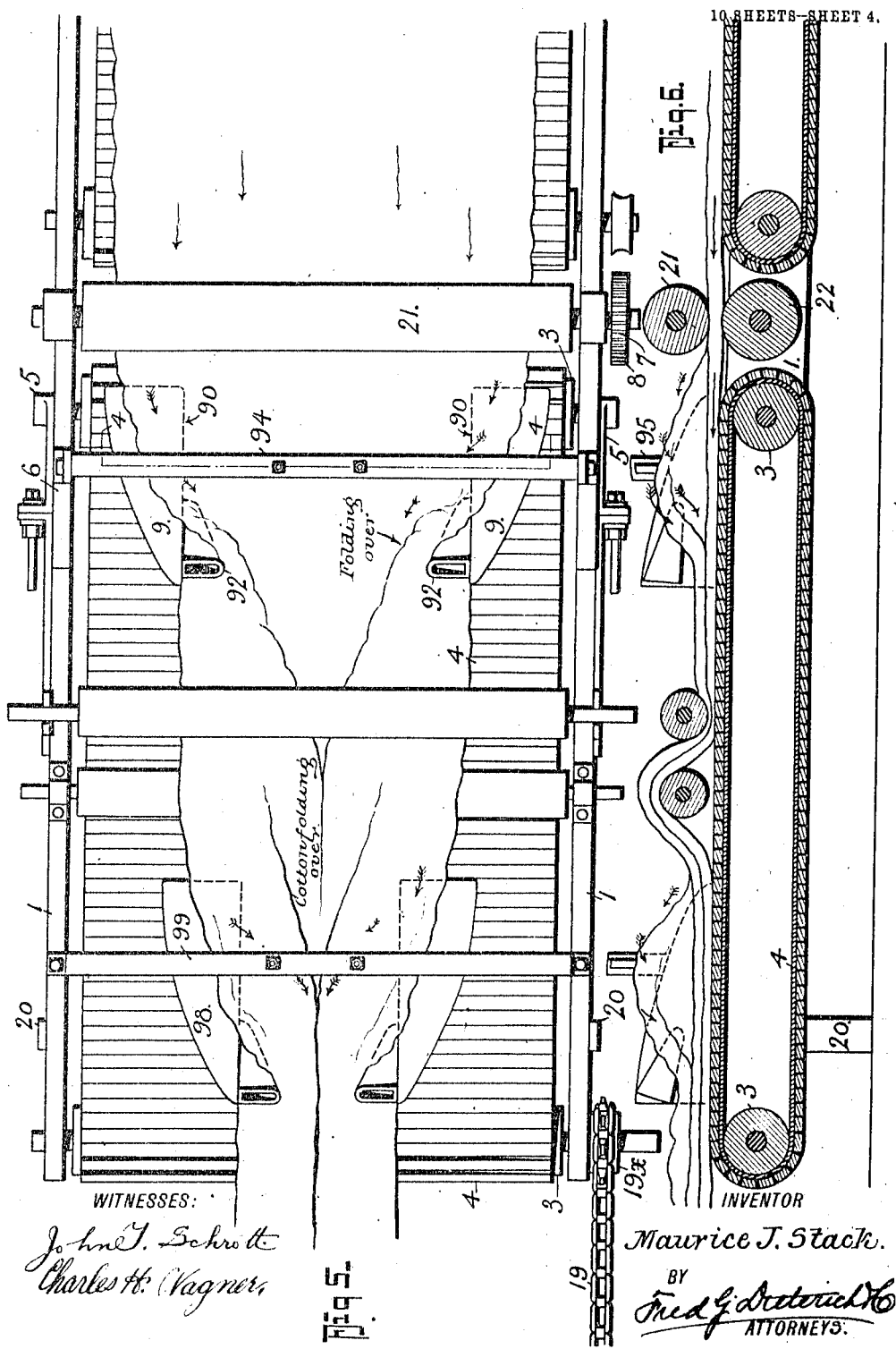

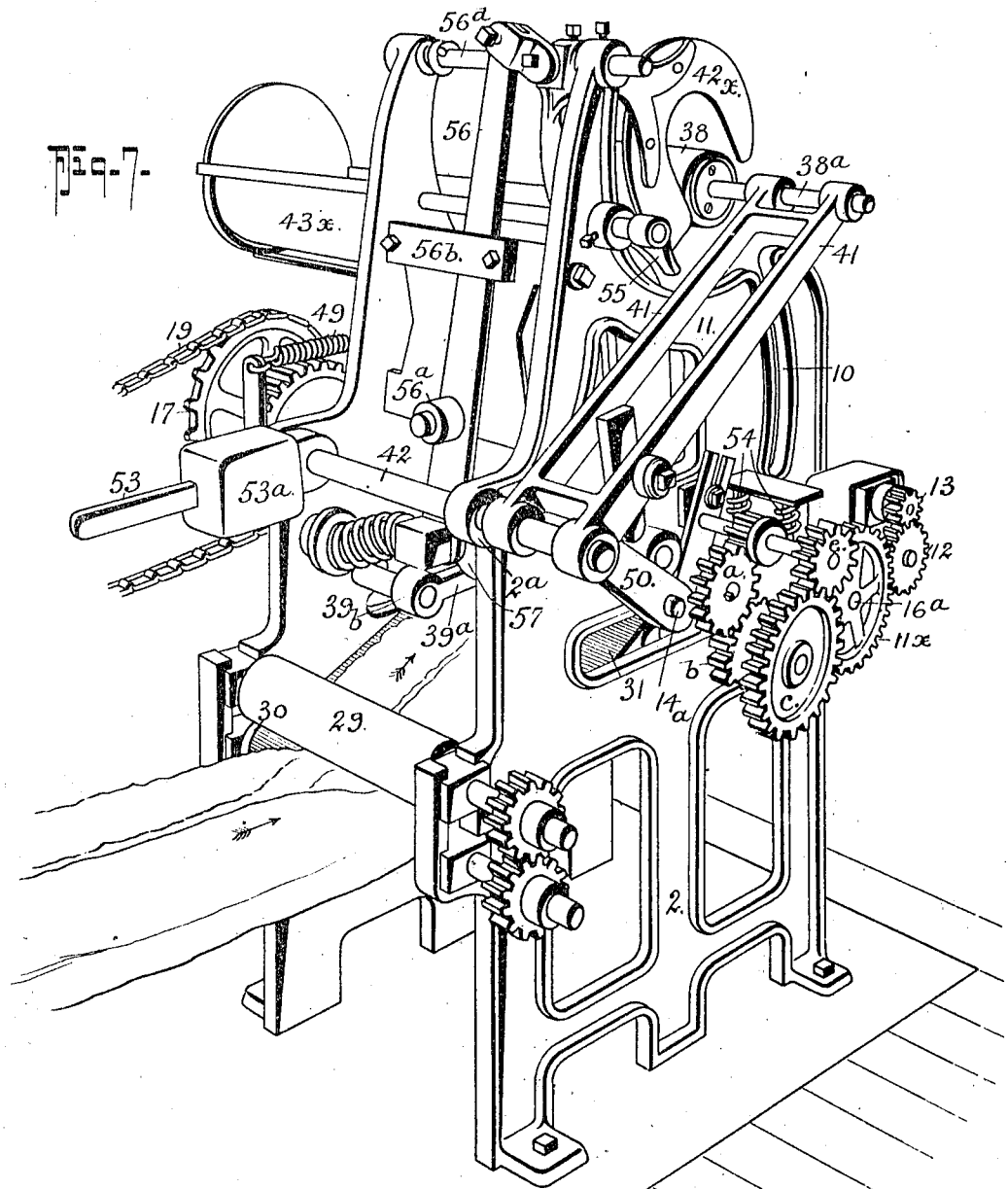

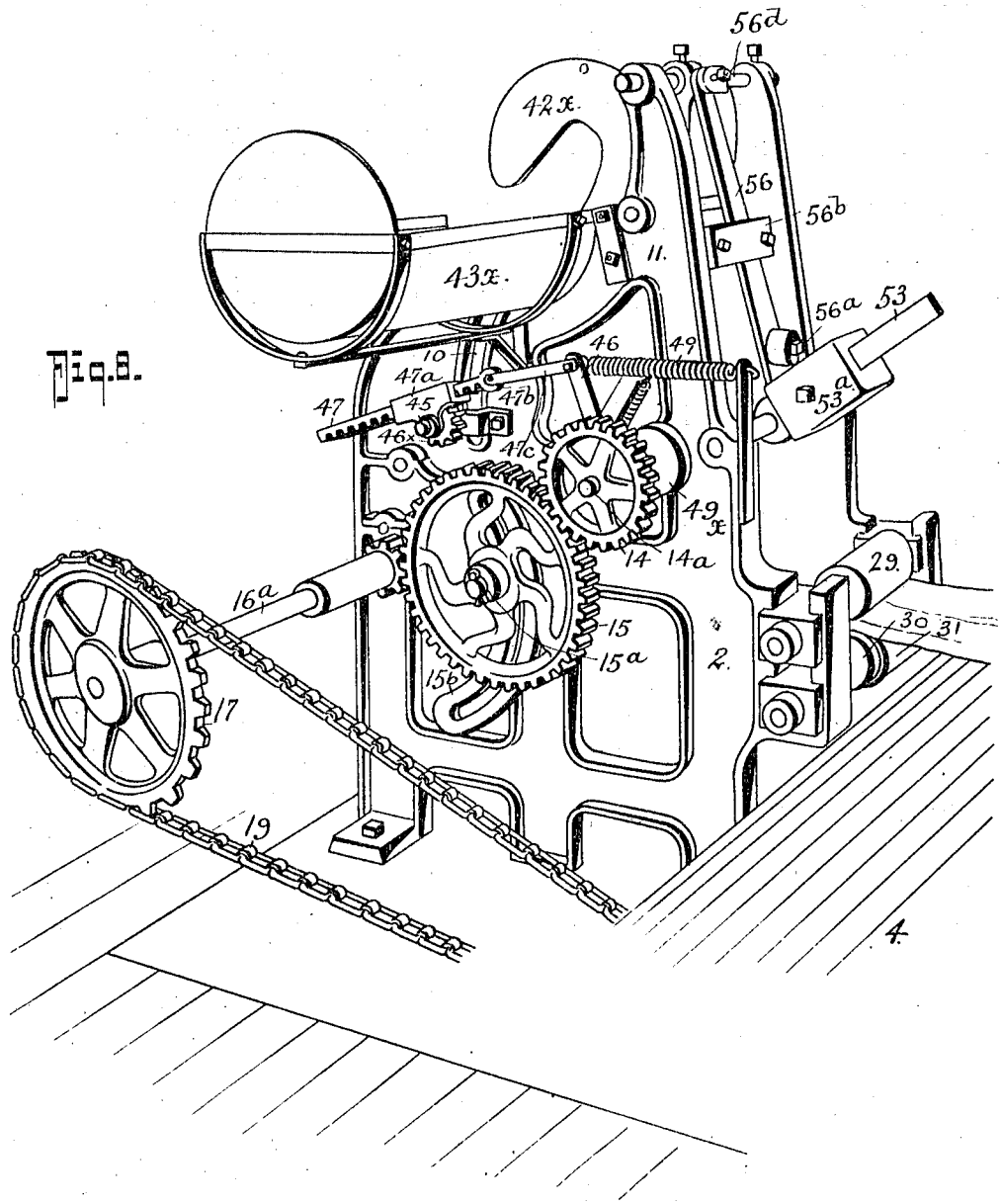

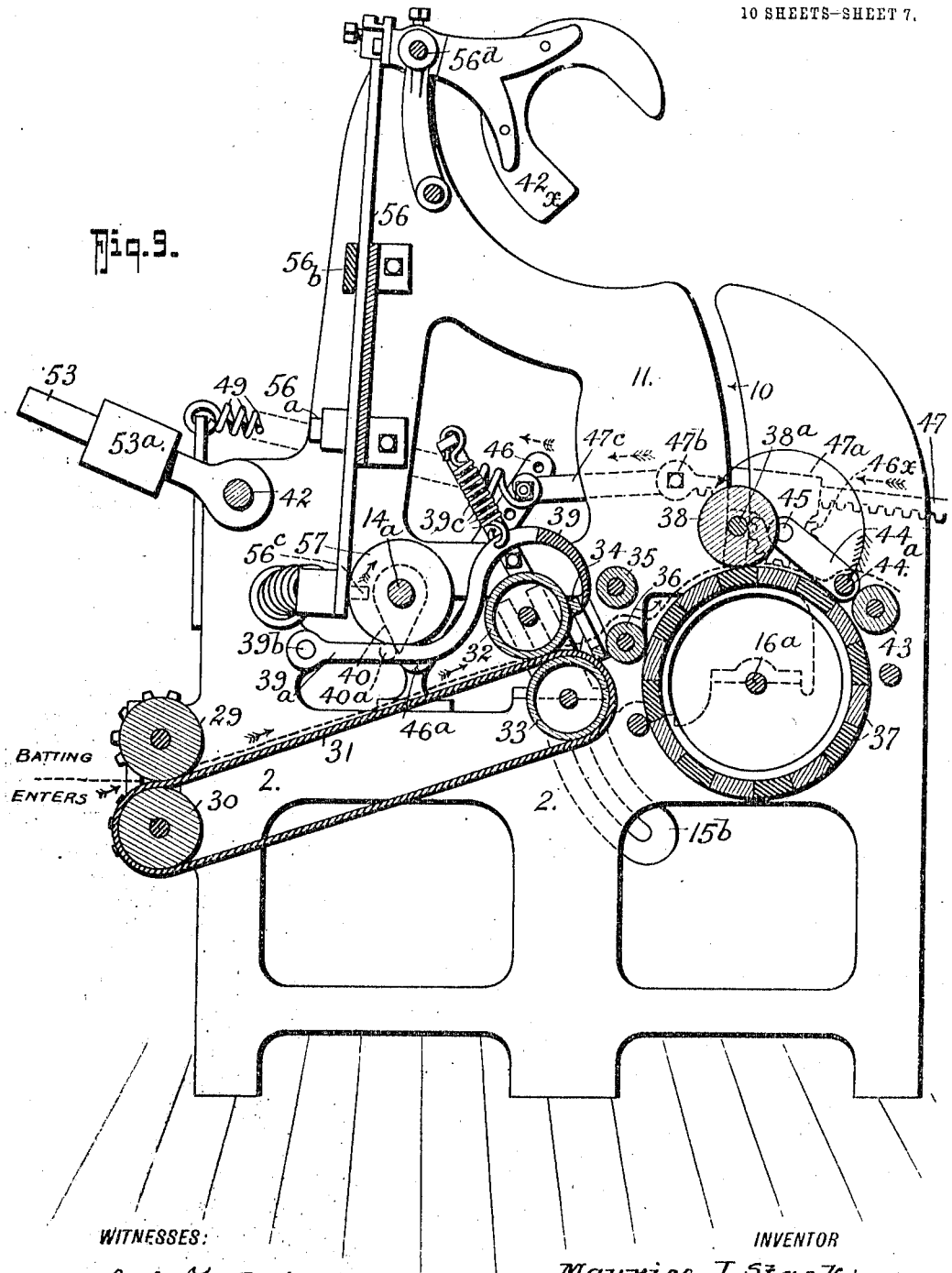

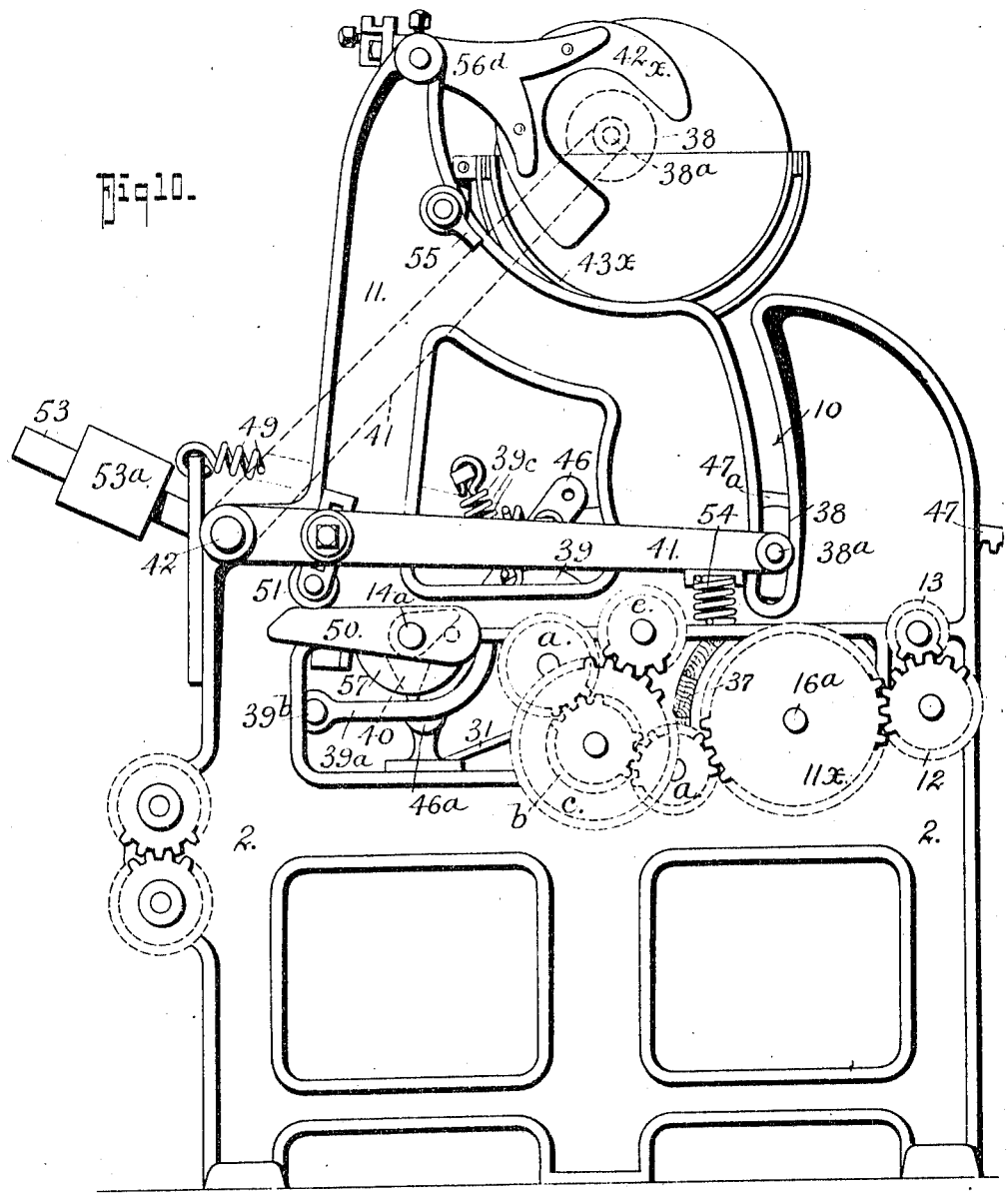

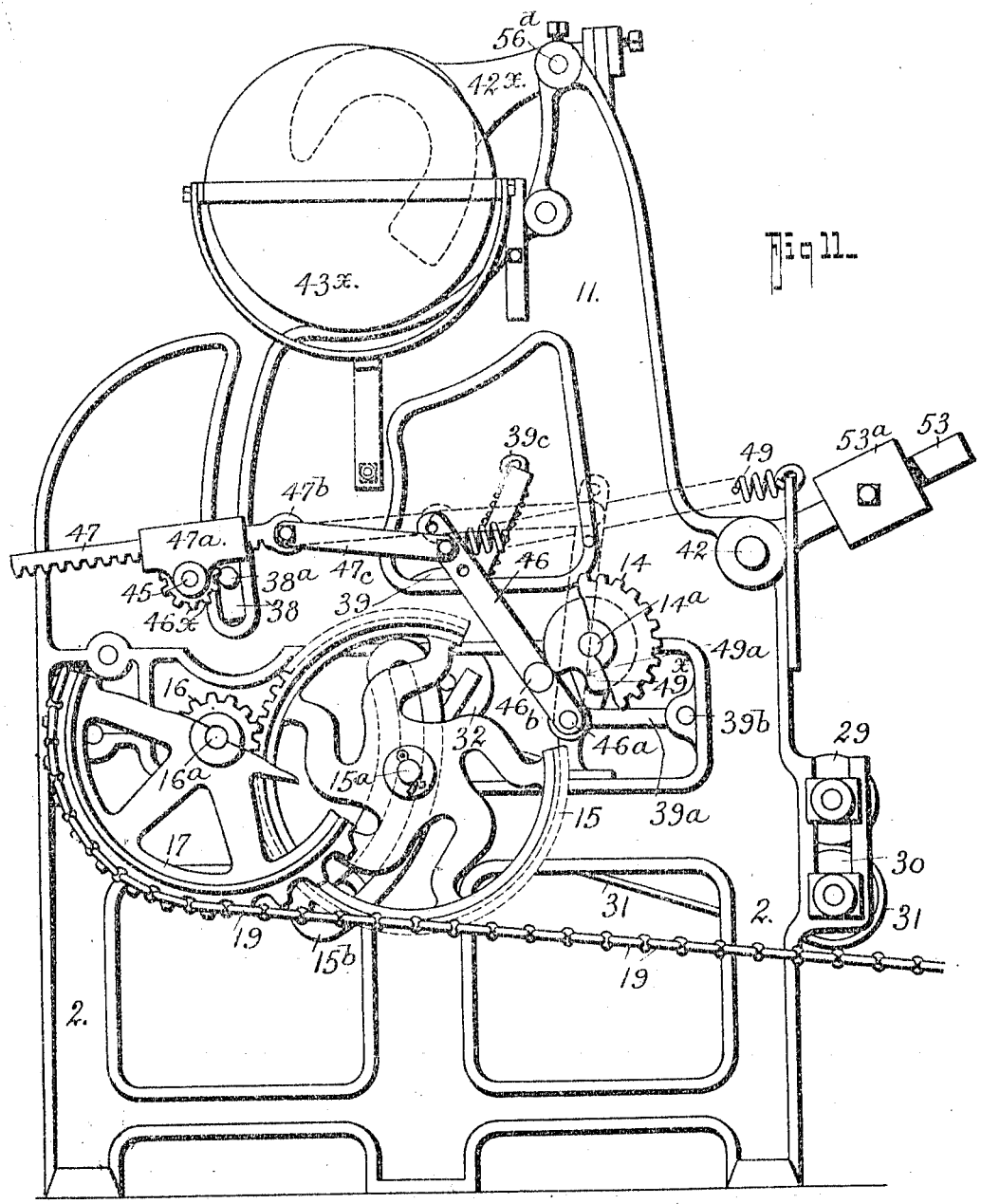

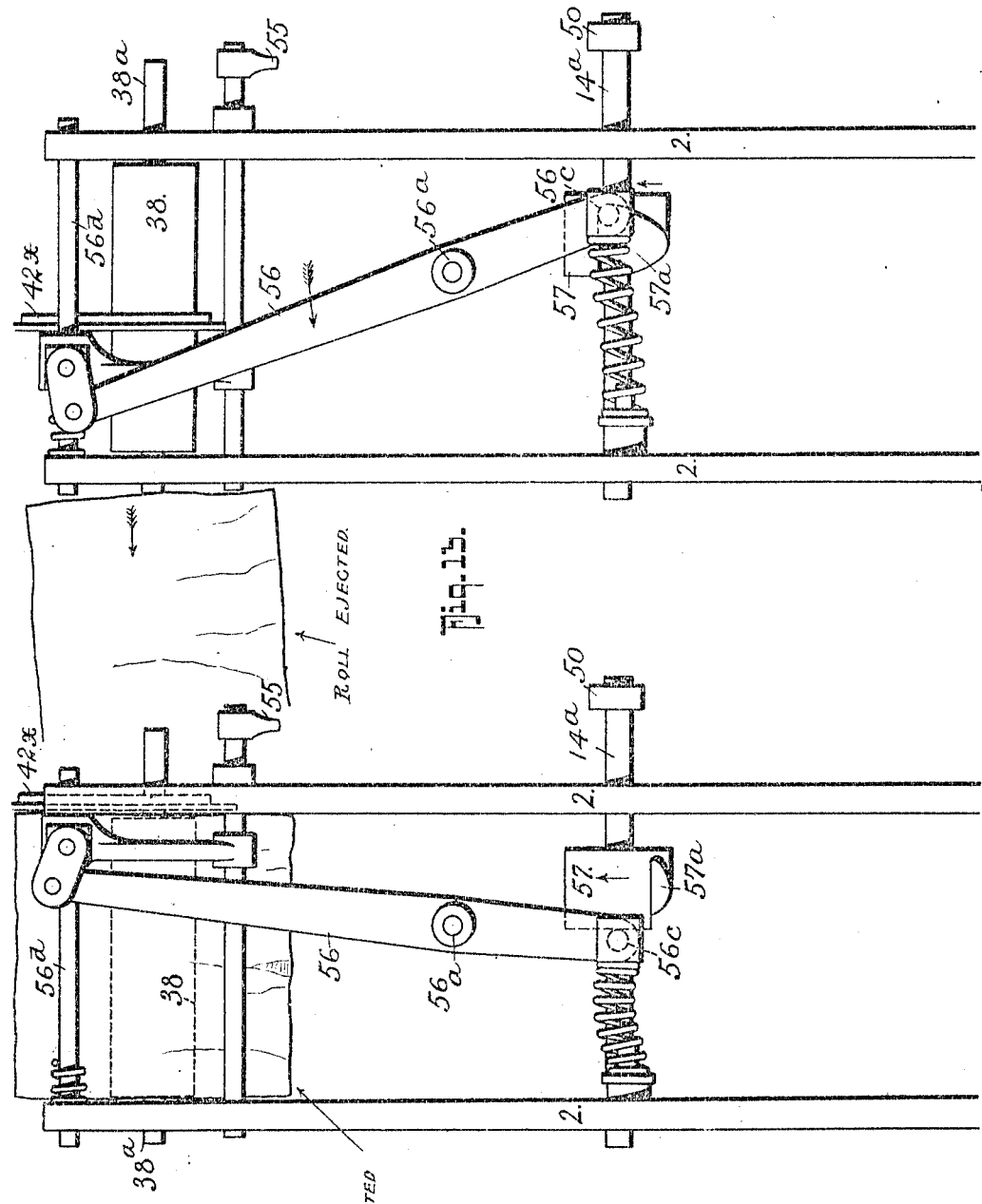

UNITED STATES PATENT OFFICE.

MAURICE J. STACK, OF COHOES, NEW YORK.

MEANS FOR FOLDING AND ROLLING UP COTTON-BATTING.

1,053,544.

Specification of Letters Patent. Patented Feb. 18, 1913.

Application filed June 19, 1909. Serial No. 503,175.

*To all whom it may concern:*

Be it known that I, MAURICE J. STACK, residing at Cohoes, in the county of Albany and State of New York, have invented a new and Improved Means for Folding and Rolling Up Cotton-Batting, of which the following is a specification.

My invention is an improved mechanism that automatically operates to bat and fold cotton into shape for comforters, mattresses and other commercial uses, then wind up the folded material into a roll of desired size, and then intermittently severing the folded sheet and discharge the rolled stock, and primarily my said invention has for its object to provide a machine of the general character stated, of a compact and durable construction, and especially designed to continuously operate to reduce the loose cotton to the desired width and thickness of bat as the latter is automatically taken up wound into a roll, cut off at predetermined intervals and discharged ready for final preparation for commercial use.

My invention also has for its object to provide a machine of the kind stated in which the action of folding, rolling and discharging is practically automatic, that is after the loose cotton body enters bat formers and the folding means the several operations mentioned are successively and positively effected.

With other objects in view that will hereinafter appear my invention comprehends in its generic nature means for reducing cotton to a bat combined with mechanism that conveys it to the rolling up roll, severing and throwing off devices and intermediate mechanism for folding up the bat to the desired thicknesses and widths as it is being conveyed from the bat forming means to the said take up and roll making, severing and discharging mechanisms.

In its more complete nature, my invention comprehends one or more sets of bat folding mechanisms for shaping the material for the particular purpose for which the product may be desired.

Again, my invention embodies certain novel features of construction and arrangement of parts that constitute the complete machine and certain sub-mechanisms all of which will be hereinafter fully described, specifically pointed out in the appended claims and illustrated in the accompanying drawings, in which:

Figure 1, is a perspective view of my complete mechanism showing the same equipped with but one "folder" for shaping the cotton into what I term "a commercial bat". Fig. 2, is a similar view showing the complete machine equipped with a plurality of "folders" to produce what I term "a comforter or mattress bat". Fig. 3, is a perspective view on a somewhat enlarged scale showing the bat rolling devices and one of the "folder" mechanisms that coöperates therewith. Fig. 4, is a transverse section taken substantially on the line 4—4 of Fig. 5. Fig. 5, is a top plan view of the mechanism shown in Figs. 3, 4 and 6. Fig. 6, is a longitudinal section of the endless bat conveyer, the bat rolling means and the bat folder devices that coöperate therewith. Fig. 7, is a perspective view of the folded bat take up, rolling and discharging mechanism, viewed from the "right side" thereof. Fig. 8, is a similar view of such mechanism viewed from the "left side" thereof, the ejector devices hereinafter referred to being shown in the "roll discharging position". Fig. 9, is a vertical longitudinal section of the mechanism shown in Figs. 7 and 8. Fig. 10, is a diagrammatic elevation of the "right side" of the mechanism shown in Figs. 7 and 8. Fig. 11, is a similar view of the "left side" of such mechanism. Fig. 12, is a rear elevation of the said mechanism, the ejector or swinging lever arm being at the "inner" position. Fig. 13, is a similar view the said arm being at the "outer" or ejecting position.

In the practical arrangement, my complete machine comprises a main framing upon which the bat rolling, folding and conveyer devices are mounted and a sub-frame that supports the mechanism that takes up the folded bat, rolls it up, severs it and discharges the rolls of batting as they reach the predetermined or gaged sizes, and the complete or general arrangement of the said frames and the mechanisms mounted thereon is best shown in Fig. 1, by reference to which it will be noticed, the main frame comprises the longitudinal side bars 1—1 supported on legs 20—20, in the opposite ends of which are journaled shafts 3—3 transversely mounted and carrying rollers to receive the slatted endless apron 4, whose upper or cotton receiving portion is so mounted as to not touch or interfere with the operation of the folder devices, presently referred to, and to provide for regulating the slack of the said apron the journals of the shafts 3—3 are mounted in adjustable boxes 5—5 but generally disclosed in the drawings since this feature and the driving gearing for transmitting motion to the operative parts, forming, per se, no special feature of my invention.

6 designates side standards mounted on the front end of the side beams 1—1, and operating in connection with the apron at that end of the machine is a platform upon which the loose cotton is fed and from which it passes to the bat forming rolls 21—22, suitably mounted in the beams 1 and the standards 6—6 and which have intermeshing gears 7 and 8 actuated from the driving gearing.

The loose cotton or stock which is fed to the rolls 21—22, in any approved way, is formed into a bat by such rolls 21—22, passes to the folder devices, the construction of which is best shown in Figs. 3 and 4, and the same consists of an opposing, parallelly disposed pair of guards each of which comprises inclined side wings 9 that merge with the upwardly inclined inner walls 90 whose upper ends, at the inner edge, have conically shaped guides 92—92, the several parts 9—90 and 92 being relatively so arranged and combined that the cotton bat as it passes from the rolls 21—22 has its opposite edges to engage and travel upon the inclined side wings 9, the said edges as they pass along the said wings 9, pass under and engage the conical guides 92—92 that tend to turn the said edges back upon themselves, see Figs. 2 and 3, such action of the guides 92 and the wings 9 causing the edge of the bat to fold inwardly over the central or body portion of the traveling bat or apron in which condition the folded bat passes to the rolling up and severing means presently described. The folders are adjustably mounted on diagonally disposed strut braces 93 secured to the bridge-like frame 94—94, the pendent end members 95 of which are fastened to the side beams 1—1, as shown, it being understood the width of the bat desired can be readily provided for by lateral adjustment of the hangers 96 that connect the folders with the brace members 93. When it is desired to make the commercial type of bat, whose ends are folded over but once, but a single set of folders is used, as in Fig. 1, but when it is desired to produce the comforter or mattress style of bat, a second set of folders 98—98 constructed like the other folders and mounted on another bridge frame 99 is provided, as shown in Fig. 2, it being understood the operation of the folders 98 is the same as that of the front folders.

So far as described it will be readily apparent that by reason of the peculiar and cooperative arrangement of the several parts, the stock as it leaves the platform and passes through the front rolls is reduced to batform which feeds into the endless apron and as it is carried forwardly the opposite ends of the bat engage the inclined wings of the folder and are turned, as it were, over onto the central part of the bat that passes between the folders, the bat as it leaves the said folders being then folded to the commercial shape with the opposite ends lapped onto the central part, in which condition it is conveyed to the rolling up, severing and discharging mechanism presently fully described, it being understood that by interposing another set of folders the previously folded bat is again folded, as in Fig. 2. The folded bat conveyed by the apron passes between the intake or feed rollers 29 and 30 mounted on the sub-frame 2 and onto an endless conveyer belt 31 that takes over the lower feed roller 30, and extends inwardly at an upward incline and over a guide roller 33 that coacts with the presser roller 32 from which the bat passes through a slotted guide or knife stop 34 with which the cutter or knife 39 coacts, in the manner presently described. 35 and 36 designate other guide rollers between which the bat passes as it leaves the knife guide 34 and which direct the said batting onto a main drawing in roll 37 having its peripheral surface preferably formed of wooden staves closely held to form a positive friction surface for engaging the batting. The bat stock, as it passes up over the roll 37, passes under a take up roll 38, the shaft ends of which are guided in the vertically elongated and curved slots 10 in the side portions 11 of the sub-frame 2. Shaft 38$^a$ of the roll 38 is rotatably mounted at one end in a pair of lifter arms 41 the lower ends of which are fixedly mounted on a shaft 42, that projects from the side 11 of the frame 2, and which is provided and held to rock in the bearing boxes 2$^a$—2$^a$ on the rear edge of the side members 11, as clearly shown in Fig. 7.

It should be here stated that the gearing on the frame 2 that controls the movements of the several devices that are successively and intermittently actuated in the manner presently explained, operates continuously while the several cam and lever devices are actuated to cut the bat, lift the continuously filling roll, and eject the bat filling when the roll 38 has been lifted to its highest point, the several parts being arranged to quickly return to the operative positions, to again take up the loose end of the bat as it is being fed from the rolls 35 and 36 and to again proceed to wind the same up on the roll 38 and that the advantages of my construction of automatically actuated parts may be understood it should be stated my machine as illustrated, in practice operates to successfully take up and deliver 18 rolls of batting per minute.

The loose end of the stock, as it passes over the large roll 37 proceeds outwardly over a guide roll 43 and over a lifting arm 44 on a link or crank member 44ª fixedly connected to a stub shaft 45. By referring now more particularly to Fig. 11, it will be seen that the shaft 45 carries a pinion 46ˣ that meshes with a rack bar 47, slidable in a housing 47ª mounted on a shaft 45 and connected at 47ᵇ to a link rod 47ᶜ which is pivotally connected with a throw lever 46 fulcrumed at 46ª on frame 2, it having a lug 46ᵇ for coöperating with the cam notch 49ª in the disk 49 that is mounted on and is rotatable with a shaft 14ª.

14 designates a driving gear mounted on the shaft 14ª and which, during each revolution, holds the lever 46 to its outer or inoperative position, see full lines Fig. 11, a coiled spring 49 attached to the lever 46 serving to quickly pull the said lever 46 to the position shown in dotted lines on Fig. 11 at the time notch 49ª comes into register with the lug 46ᵇ and thereby produces a pull thrust on rack 47, and rotates gear 46ˣ, and swings link arm 44ª and the member 44 in the direction of the dotted lines on Fig. 9. By reason of the structural arrangement of the parts, as stated, when the link arm 44ª swings in the direction stated, it causes the loose end of the bat to pass over the roll 38 and in position to wind under the said roll 38, it being understood that so soon as the lug 46ᵇ is forced out of notch 49ª in the disk 49, rack 47 rotates the gear 46ˣ backwardly and returns the members 44—44ª to the normal position ready to throw the next loose bat end over the roll 38 after the roll of batting last gathered thereon has been discharged therefrom in the manner presently explained, and such roll 38 has dropped back to its lowermost position against the large drawing in roll 37. The stock goes around the roll 38 to whatever weight that the lifting arms 41 are adjusted for, the adjustment of the arms 41 being provided for by an arm 53 that projects forwardly from the shaft 12 and a weight 53ª slidably adjustable thereon is clearly shown in the drawing. As the batting or stock winds on the roll 38, the latter is gradually lifted by the increasing diameter of the bulk that winds thereon and the several parts are relatively so arranged that when the roll of batting is of the desired weight, the arms 41 are quickly swung up to move the said bat roll upwardly in position to be wiped off the roll 38 by the ejecting mechanism shown in Figs. 7 and 8 and hereinafter specifically referred to. For lifting the said arms 41 at the proper time a wiper cam 50 is mounted on the cross shaft 14ª journaled on the frame and that carries the driving gear 14 and the notched disk or cam member 49. Gear shaft 14ª receives motion from an idler gear 15 mounted on a stub shaft 15ª in a curved guide slot 15ᵇ and which meshes with a pinion 16 on a shaft 16ª on which the roller 37 is mounted, and which carries a chain wheel 17 that receives motion from the endless chain 19 that takes over a chain gear 19ˣ on the adjacent shaft that carries one of the endless apron rolls, as best shown in Fig. 1. Stub shaft 15ª is adjustably mounted in the guide slot 15ᵇ so the idler may be readily raised or lowered with respect to the shaft 14ª, and said stub shaft, in practice, is clamped in the slot at its different adjustments in any well-known manner.

The purpose of adjustably mounting the wheel 15 is best explained as follows: In the manufacture of cotton batting, there are six regular weights made to suit the trade for the commercial sizes and therefore it requires a separate size of power transmission gear for each size of bat to have weight and size correct. The different sizes of gears are interchangeably mounted on the shaft 14ª and to bring these different gears to train with the driver gear 16 the gear 15 which is always held in mesh with the gear 16, is raised or lowered by shifting the stub shaft axle 15ª to bring it in mesh with the particular size of gear 14 that may be used on shaft 14ª.

Shaft 14ª carries a wiper cam 40, which at each complete revolution of the shaft 14ª, and the drive gear mounted thereon, engages a lug 40ª that extends inwardly from the frame 39ª that carries the knife 39 and which is fulcrumed at 39ᵇ on the frame, see Fig. 9, from which it will also be seen the knife frame 39ª is normally pulled upwardly by a spring 39ᶜ to lift the cutting member 39 out of the path of the passing bat, it being understood that when the roll 38 has filled to make the roll of cotton batting desired, the cam 40 engages lug 40ª and forces the knife 39 down through the guide 34 to sever the bat, it being also apparent from the figure that the end of the sheet that passes from the rolls 33 and 32 is directed to and taken up by the gripper or in-feeding rolls 35 and 36 that direct the new bat end onto the large in-feed roller 37, and take-up roll 38 as soon as it has been dropped down into contact with the roll 37.

On the end opposite that which carries chain gear 17, shaft 16ª carries a gear 11ˣ that meshes with an idler 12 in turn geared to a pinion 13 on the shaft of the small roller 43 and the said gear 11ˣ also meshes with a train of gears $a$, $a$, $b$—$c$ and $c$, the latter being on the shaft of the in-feed roll 35 while gears $a$ and $b$ impart the desired motion to the rolls 32—33.

In the practical arrangement of the operating parts they are relatively so timed for action that immediately after the stock is severed by the cutter 39, gear 14 through rotation of its shaft 14ᵃ, causes the cam 50 to engage a roller bearing 51 adjustably mounted on the arms 41 and quickly raises the said arm to lift the wound bale on the roll 38, the raising of the arms 41 continuing until it rises to a stop 55.

57 designates a cam disk mounted on and to rotate with shaft 14ᵃ and it has a cam way 57ᵃ so arranged that immediately after the cotton bat rolls have been lifted it coöperates with an ejecting mechanism, best shown in Figs. 12 and 13 and which I shall now describe.

56 is a lever fulcrumed on a stud 56ᵃ on the framing and in a manner adapted for being oscillated transversely of the machine under the action of the cam disk 57, it being slowly moved in one direction by direct connection with the cam disk 57, and quickly moved in the opposite direction by the tension of a spring in which the tension is stored up as the lever is moved under cam action, in the manner readily understood by reference to Figs. 12 and 13. The upper part of lever 56 sweeps through a guide 56ᵇ on the main frame, see Figs. 7, 8 and 9 and its lower end has a member 56ᶜ that engages the camway 57ᵃ on the member 57, the said camway serving to return the lever 56 to a position that allows the filled roll 38 to rise upon transverse alinement with a claw shaped wiper or ejector head 42ˣ which, when the lower end of the lever 56 is released from the cam member 57, is shifted laterally by the sweep action of the lever 56 provided by the spring action on the lower end of lever 56 and to provide for such action, head 42ˣ is mounted to freely slide on the cross or guide rod 56ᵈ in the upper end of the frame, and the said head 42ˣ is also linked to the upper end of the lever 56 so as to be positively shifted in reverse transverse directions as the lever 56 is oscillated in the manner hereinbefore stated. When the lower end of the lever 56 is released by the cam 57 it is quickly shifted in the direction of the arrow and the claw head, which straddles the roll 38, wipes the cotton rolled thereon off the said roll 38 and discharges it endwise into a pan 43ˣ that projects laterally from the upper end of the framing, as shown.

It should be here mentioned that in the time that the roller 38 is lifted and the cotton thereon is discharged and the said roller 38 is being returned to its mate roll 37, the loose end of the sheet or bat that feeds up the endless belt 31 is being pressed through the rolls 35—36 over roll 37 and small guide roll 43 and the throwing device member 44, so that ample stock is provided for being thrown over and around the roller 38 so it will immediately start to wind up on the said roll 38. Since the arms 41—41 are weighted, they are, as it were, substantially counterbalanced by the weight thereon, but to take up any undue shock, buffer springs 54 are also provided, that act as cushions for taking up the shock of the arms as they fall.

From the foregoing taken in connection with the drawings it is believed the complete construction and the operation of the several parts as a whole and the sub-mechanisms for accomplishing the different operations successively will be readily understood by those skilled in the art to which this invention relates.

By reason of combining the different parts of the complete machine in the manner described and shown, the several sub-mechanisms are interdependently connected and their several intermittent and successive operations occur during a continuous action of baling and folding the cotton, and feeding it through the take-up devices that pick up the loose or cut ends of the bat to continuously carry the formed and folded bat to the rolling-up and discharging means.

The driving means that moves the apron 4 turns the gear 19ˣ and by sprocket chain 19 motion is imparted to gear 17 on the main drive shaft of the "bat head" end of the machine, the gear 17 meshing with gear 16, which engages the idler gear 15, the latter being mounted so it can be adjusted to whatever change gear suitable to size and weight of bat required.

Having thus described my invention what I claim and desire to secure by Letters Patent is:

1. In a machine of the character described, the combination with a bat rolling up means including a spindle on which the bat rolls up, an ejector including a member for engaging one end of the accumulated bat roll, and means for moving the said member lengthwise of the spindle at times, whereby to strip the roll endwise of the spindle.

2. In a machine of the character described, the combination with a means for rolling up a cotton bat, conveyer devices for feeding the bat to the said means, an ejector, a bat cutter, devices for receiving the cut end of the bat and feeding it to the rolling up means, mechanism for bringing the bat roll in position to be engaged by the ejector, and mechanism coöperating with the several mentioned parts for actuating the said parts at predetermined times as set forth.

3. In a machine of the character described, a bat winding mechanism, means for feeding the bat to said mechanism, a cutting mechanism interposed between the feeding and winding mechanisms and means for endwise discharging the wound up bat after it has been cut from the sheet.

4. In a machine of the character described, a bat winding mechanism, means for feeding the bat to said mechanism, a cutting mechanism interposed between the feeding and winding mechanisms, means for conveying the bat from the feeding mechanism to the winding mechanism past the cutting mechanism together with means for endwise discharging the wound up bat after it has been severed from the sheet.

5. In a machine of the character described, a bat winding mechanism, means for feeding the bat to said mechanism, a cutting mechanism interposed between the feeding and winding mechanisms, means for conveying the bat from the feeding mechanism to the winding mechanism past the cutting mechanism, said winding mechanism including a take-up roll and devices for throwing the end of the bat around the take-up roll to start the winding up of the bat.

6. In a machine of the character described, a bat winding mechanism, means for feeding the bat to said mechanism, a cutting mechanism interposed between the feeding and winding mechanisms, means for gripping the end of the bat after being severed and conveying it to the winding mechanism, said winding mechanism including a take-up roll and devices for throwing the end of the bat around the take-up roll to start the winding up of the bat.

7. In a machine of the character described, a bat feeding mechanism, a bat winding up mechanism, including a take-up roll and a winding roll coöperating therewith, combined with a bat severing mechanism, located between the feeding and winding-up mechanisms, and a loose end starting mechanism, said take-up roll being located between said starting mechanism and said severing mechanism, in virtue of which the bat will first pass the feeding mechanism, then the severing mechanism, and subsequently pass the winding-up mechanism to come into position with relation to the loose end starting mechanism.

8. In a machine of the character described, mechanism for winding up a bat into roll form comprising a take-up roll, and a winding roll coöperating therewith, combined with means for passing the end of a bat around the take-up roll at the commencement of the winding operation, said last named means comprising an arm over which the end of the bat passes, and means for moving said arm to throw the end of the bat around the take-up roll.

9. In a machine of the character described, a bat rolling mechanism comprising a winding roll, a shiftable take-up roll coöperating therewith, and means for conveying a bat to said roll, and means for stripping the bat from said take-up roll at intervals.

10. In a machine of the character described, a bat rolling mechanism comprising a winding roll, a shiftable take-up roll coöperating therewith, means for conveying a bat to said roll, means for stripping the bat from said take-up roll at intervals, together with means for severing the rolled portion of the bat from the remainder of the bat.

11. In a machine of the character described, a bat rolling mechanism comprising a winding roll, a shiftable take-up roll coöperating therewith, means for conveying a bat to said roll; means for stripping the bat from said take-up roll at intervals, and means coöperating with the take-up roll to throw a loose end of the bat around the take-up roll in starting the winding up operation.

12. In a machine of the character described, a bat rolling mechanism comprising a winding roll, a shiftable take-up roll coöperating therewith, means for conveying a bat to said roll, means for stripping the bat from said take-up roll at intervals, together with means for severing the rolled portion of the bat from the remainder of the bat, and means coöperating with the take-up roll to throw a loose end of the bat around the take-up roll in starting the winding up operation.

13. In a machine of the character described, a bat winding mechanism comprising in combination with the winding roll and the take-up roll around which the bat is wound, means for supporting said take-up roll, means to move toward or from the winding roll, means for counterbalancing said supporting means, another means for effecting a moving of said supporting means to move said take-up roll away from said winding roll, and means for stripping the bat from said take-up roll after it has been moved by said moving means.

14. In a machine of the character described, the combination with means for winding a cotton bat into a roll, said means comprising a stationarily mounted winding roll and a vertically movable take-up roll that co-acts with the winding roll, means for feeding the bat to the contacting faces of the two rolls, a means for throwing the loose end of the bat over the take-up roll toward the infeed side thereof, together with means for severing the roll from the bat in advance of the action of said end throwing means, said end throwing means being separate and distinct from said severing means, and operating after the bat has passed the severing means and the take-up roll.

15. In a machine of the character described, the combination with means for winding a cotton bat into a roll, said means comprising a stationarily mounted winding roll and a vertically movable take-up roll that coacts with the winding roll, means for feeding the bat to the contacting faces of the two rolls, means for throwing the loose end of the bat over the take-up roll toward the infeed side thereof, a device for severing the bat at the infeed side at predetermined intervals, and a means for picking up the cut end of the bat and directing it to the said infeed side of the roll.

16. In a machine of the character described, a bat winding mechanism including a take up roll, means for feeding the bat to said mechanism, a cutting mechanism interposed between the feeding and winding mechanisms, means for receiving the end of the bat and conveying it to the winding mechanism, said winding mechanism including devices independent of the take up roll and cutting mechanism and operating at a predetermined time after the operation of the latter, for conveying the bat around the take up roll to start the winding up of the bat.

17. In a machine of the character stated, means for forming cotton into a bat, a bat winding up mechanism including a winding roll and a means for throwing the end of the bat around the winding roll to start the winding operation, a cutting mechanism separate from the end throwing mechanism for severing the wound portion of the bat from the remainder of the bat, a feeding mechanism for conveying the bat to said cutting and winding mechanisms and means for removing the wound bat.

18. In a machine of the character stated, means for forming cotton into a bat, a bat winding up mechanism including a winding roll and a means for throwing the end of the bat around the winding roll to start any winding operation, a cutting mechanism for severing the wound portion of the bat from the remainder of the bat, a feeding mechanism for conveying the bat to said cutting and winding mechanisms, and means for removing the wound bat from said take up roll and for restoring said take up roll into position to receive the end of the unwound bat portion.

19. In a machine of the character described, a bat winding up mechanism including a take up roll and a winding roll coöperating therewith, a feeding means for conveying the bat to said winding mechanism, a cutting mechanism interposed between said feeding and winding mechanisms to sever the wound bat portion from the remaining portion of the bat, means for mounting said take up roll to be movable toward and away from said winding roll, means for moving said take up roll away from said winding roll when the wound portion of the bat is severed, and means for subsequently removing the wound bat from said winding roll.

20. In a machine of the character described, a bat winding up mechanism including a take up roll and a winding roll coöperating therewith, a feeding means for conveying the bat to said winding mechanism, a cutting mechanism interposed between said feeding and winding mechanisms to sever the wound bat portion from the remaining portion of the bat, means for mounting said take up roll to be movable toward and away from said winding roll, means for moving said take up roll away from said winding roll when the wound portion of the bat is severed, means for subsequently removing the wound bat from said winding roll, and means for restoring said take up roll into position adjacent to said winding roll when empty.

21. In a machine of the character described, a bat winding up mechanism including a take up roll and a winding roll coöperating therewith, a feeding means for conveying the bat to said winding mechanism, a cutting mechanism interposed between said feeding and winding mechanisms to sever the wound bat portion from the remaining portion of the bat, means for mounting said take up roll to be movable toward and away from said winding roll, means for moving said take up roll away from said winding roll when the wound portion of the bat is severed, means for subsequently removing the wound bat from said winding roll, and means separate from said take up roll for conveying the end of the bat around said take up roll to start the winding up operation.

22. In a machine of the character described, a bat winding up mechanism including a take up roll and a winding roll coöperating therewith, a feeding means for conveying the bat to said winding mechanism, a cutting mechanism interposed between said feeding and winding mechanisms to sever the wound bat portion from the remaining portion of the bat, means for mounting said take up roll to be movable toward and away from said winding roll, means for moving said take up roll away from said winding roll when the wound portion of the bat is severed, means for subsequently removing the wound bat from said winding roll, means for restoring said take up roll into position adjacent to said winding roll when empty, and means separate from said take up roll for conveying the end of the bat around said take up roll to start the winding up operation.

23. In a machine of the character described, a bat forming mechanism, a bat conveying mechanism, and a bat winding-up mechanism, said mechanisms being successively arranged in the order stated whereby said conveying mechanism will convey the bat to the winding-up mechanism, and a bat severing mechanism interposed between the conveying mechanism and the winding up mechanism, said winding up mechanism including a take-up roll and a means for maintaining the bat in engagement with said take-up roll, combined with means for engaging the severed end of the bat after it passes between said take-up roll and the means for holding the bat in contact with said take-up roll and conveying the severed end around said take-up roll to start the rolling up operation.

24. In a machine of the class described a bat rolling up mechanism, a conveyer for conveying a continuous bat to said rolling up mechanism, said conveyer and said rolling up mechanism being separate from one another and means interposed between said conveyer and said rolling up mechanism for severing the bat at intervals and means adjacent to said rolling up mechanism for starting the bat end on said rolling up mechanism.

MAURICE J. STACK.

Witnesses:
 JOHN SCANLON,
 M. J. CONBOY.